Feb. 25, 1964     L. D. P. KING     3,122,424
GRAPHITE BONDING METHOD
Filed Dec. 13, 1961

INVENTOR.
L. D. Percival King 3,122,424
GRAPHITE BONDING METHOD
L. D. Percival King, Santa Fe, N. Mex., assignor to the United States of America as represented by the United States Atomic Energy Commission
Filed Dec. 13, 1961, Ser. No. 159,194
4 Claims. (Cl. 29—195)

This invention relates to a graphite bonding process and more particularly to a process in which platinum is used to form a bond between graphite pieces, and between graphite and other metals.

In the formation of a graphite fuel cotainer as used in a phosphoric liquid fuel nuclear reactor, it was necessary to find a method that would allow graphite to be bonded to itself. Another important need was to find a method whereby graphite is bonded or joined to metals without forming a metal carbide since phosphoric fuel attacks bonds formed by reacting graphite with a metal to form a bond whose composition is a metal carbide reaction layer or compound. Joints made by the formation of a carbide tend to be brittle and do not remain stable if subjected to high temperatures for long periods of time since the reaction layer grows and converts all of the free metal into the carbide. Furthermore, the bond must have a coefficient of heat expansion similar to that of graphite so as to withstand temperature gradients which the fuel container is subject to during the operation of the reactor.

It is therefore an object of this invention to provide a method of joining or bonding graphite pieces, the said bond or joint being able to withstand the corrosiveness of liquid nuclear fuels and the reactor's temperature variations.

It is another object of this invention to provide a graphite joint or bond that withstands temperatures in excess of 1600° C.

It is a further object of this invention to provide a graphite to metal bond which is not brittle or subjected to further chemical reaction during long periods at high temperatures.

Applicant has discovered that a platinum-graphite bond meets all of the aforementioned requirements. Platinum forms an excellent mechanical bond with the graphite due to the wetting action of molten platinum on graphite surfaces. This bond is stable at temperatures in excess of 1600° C. and has excellent non-corrosive properties, i.e., it is chemically inert to other elements and compounds and in particular to phosphoric reactor fuels. The platinum graphite bond so formed is an intimate network of platinum and graphite that has a high tensile strength and has very good noncorrosive properties at high temperatures.

Another important use of this invention is the bonding of graphite to various metals. It is well known in the prior are that platinum will braze or solder to many metals such as gold, silver, iron, nickel, copper, tin, zinc, and lead. Thus, by bonding the platinum to graphite and then brazing the desired metal to the platinum, a graphite-metal bond can be formed.

Further advantages of the present invention will become apparent from the following description of a preferred method, illustrated by way of example in the accompanying drawings, in which.

Figure 1:
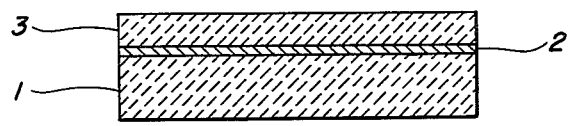
FIGURE 1 is an elevation cross sectional view showing graphite pieces joined together by a platinum metal layer.

A thin sheet of platinum metal 2 of at least 2 mils thickness is placed between the two graphite pieces 1 and 3 that are to be bonded or joined together (see FIGURE 1). The resulting "sandwich" (graphite-platinum-graphite) is heated in an inert atmosphere to a temperature sufficient to melt the platinum (approximately 1800° C.) and then cooled to room temperature. The molten platinum must be confined between the graphite pieces so that the platinum will flow and form a bond of uniform thickness without escaping from the joint. The thickness of the joint or bond is dependent on the pressure applied to the graphite piece; however, in the usual application, the weight of the upper piece of graphite is sufficient without any external pressure being applied. A platinum sheet of 5 mils thickness will form a bonding layer of about 2 mils. The thickness of the platinum foil can vary from 2 mils on up; however, there is no increase in bond strength obtained by the use of foils with a thickness greater than 6 mils. On the other hand, the minimum thickness is quite critical. The platinum foil must be at least 2 mils thick, because the molten metal of thinner foils defuses completely into the graphite leaving insufficient platinum at the boundary of the joint.

Graphite specimens bonded or joined in accordance with the method outlined above have been rapidly temperature cycled close to the melting point of platinum without affecting the bond strength. One test was to rapidly cycle the bonded piece 500 times between the temperatures of 400° C. to 1600° C. Fuel containers made from the above process have also been tested in regard to the corrosiveness caused by phosphoric nuclear fuels and have been found to be unaffected.

Figure 2:
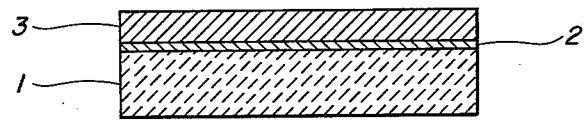
FIGURE 2 is an elevation cross sectional view showing a graphite piece and a metal joined together by platinum.

Another embodiment of this invention is to bond the platinum 2 to graphite 1 and the platinum 2 to another metal 3 (see FIGURE 2). This is accomplished by the same method as described above and then machining away the top layer of the graphite so as to leave an exposed platinum metal that is still bonded to the bottom layer. This platinum layer is then brazed or soldered to other metals by methods well known in the art of platinum brazing. Joints so formed will be stable at high temperatures and do not undergo any chemical reaction with the graphite.

All graphite used in this invention is of reactor grade quality, i.e., a low permeability, high density graphite. The density of said graphite is between 1.6 and 2.0 grams per cubic centimeter. This invention is not restricted to such graphites and is applicable to low density graphites provided a thicker layer of platinum is used so that a platinum metal layer exists after the melting step at the joint. Within the range of graphite densities stated above, a platinum layer of 2 mils is sufficient to bond graphite to itself or to form a graphite-platinum-metal bond.

Although the invention is described in detail, it is clearly understood that the same is by way of illustration, the scope of this invention being limited only by the terms of the appended claims.

What is claimed is:

1. A method of preparing a surface of a first graphite member to be joined to a metallic surface comprising placing a platinum foil of at least 2 mils thickness between and in contact with the surfaces of the first and second graphite members, heating the assembly in an inert atmosphere to a temperature of about 1800° C., cooling to room temperature, machining away said second graphite member leaving an exposed platinum layer on said first graphite member for joining said first graphite member to said metallic surface by soldering or brazing.

2. A method of bonding graphite members comprising placing a platinum foil of at least two mils thickness between and in contact with the graphite surfaces to be joined, heating the assembly in an inert atmosphere to a temperature of about 1800° C. and then cooling to room temperature.

3. An article made by the method of claim 1 comprising a graphite member, a platinum layer, and a metal member that is brazable to platinum, said graphite member being bonded to the said platinum layer that has been melted and solidified, and the said exposed platinum layer being joined to the metal member by brazing.

4. An article made by the method of claim 2 comprising two members of graphite bonded together by a platinum layer that has been melted and solidified.

References Cited in the file of this patent
UNITED STATES PATENTS

| | | |
|---|---|---|
| 1,060,361 | Rea | Apr. 29, 1913 |
| 2,267,342 | Schwartz | Dec. 23, 1941 |
| 2,920,385 | Fike | Jan. 12, 1960 |
| 2,979,814 | Steinberg | Apr. 18, 1961 |
| 2,984,604 | Duva | May 16, 1961 |
| 3,010,197 | Roehr | Nov. 28, 1961 |
| 3,039,177 | Burdett | June 19, 1962 |
| 3,065,532 | Sachse | Nov. 27, 1962 |